United States Patent
Piirainen et al.

(10) Patent No.: US 6,763,010 B1
(45) Date of Patent: Jul. 13, 2004

(54) MULTIPLEXING METHOD AND TRANSCEIVER

(75) Inventors: Olli Piirainen, Oulu (FI); Kari Niemelä, Oulu (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/331,994

(22) PCT Filed: Oct. 29, 1998

(86) PCT No.: PCT/FI98/00842

§ 371 (c)(1),
(2), (4) Date: Jul. 26, 1999

(87) PCT Pub. No.: WO99/22559

PCT Pub. Date: May 14, 1999

(30) Foreign Application Priority Data

Oct. 31, 1997 (FI) .................................................. 974107

(51) Int. Cl.[7] .......................... H04J 3/00; H04B 7/212
(52) U.S. Cl. ...................... 370/337; 370/321; 370/326; 370/336; 370/345; 370/347
(58) Field of Search ............................... 370/321, 326, 370/336, 337, 347, 345

(56) References Cited

U.S. PATENT DOCUMENTS

| | | | | |
|---|---|---|---|---|
| 5,412,655 A | * | 5/1995 | Yamada et al. ............ | 370/60.1 |
| 5,506,837 A | * | 4/1996 | Sollner et al. ............. | 370/31 |
| 5,533,004 A | | 7/1996 | Jasper et al. | |
| 5,577,087 A | * | 11/1996 | Furuya ...................... | 375/377 |
| 5,648,967 A | | 7/1997 | Schulz | |
| 5,729,535 A | * | 3/1998 | Rostoker et al. ........... | 370/328 |
| 5,754,538 A | * | 5/1998 | Kumar et al. .............. | 370/347 |

FOREIGN PATENT DOCUMENTS

WO  WO 97/25827  7/1997

OTHER PUBLICATIONS

International Search Report for PCT/FI98/00842.

* cited by examiner

Primary Examiner—Vivian Chin
Assistant Examiner—Eugene Yun
(74) Attorney, Agent, or Firm—Squire, Sanders & Dempsey L.L.P.

(57) ABSTRACT

The invention relates to a multiplexing method and a transceiver used in a TDMA radio system. The transceiver sets up a connection to another transceiver by transmitting modulated signals in time slots. The transceiver comprises coding means for channel-coding a signal that consists of bits and that is formed into a communication signal, and interleaving means for interleaving the bits of the channel-coded Signal into blocks of a predetermined size. The transceiver also comprises multiplexing means that receive blocks from the interleaving means and that multiplex the interleaved blocks of at least two channel-coded signals together. The transceiver further comprises modulation means for modulating the blocks multiplexed by the multiplexing means with at least four-level modulation before the modulated signal blocks are transmitted as a communication signal in a time slot, so that the transmission speed of the communication signal and the number of the connections to be established can be increased.

10 Claims, 3 Drawing Sheets

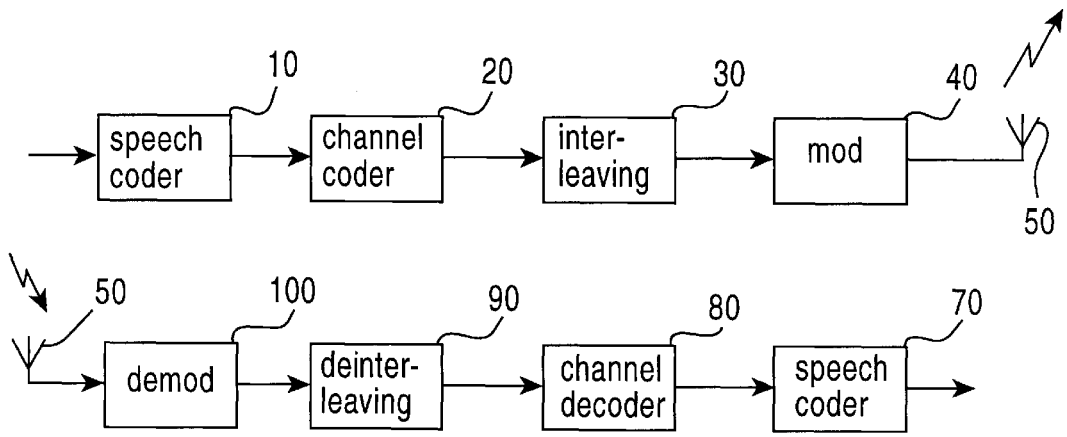
Fig. 1 Prior Art
Fig. 2 Prior Art
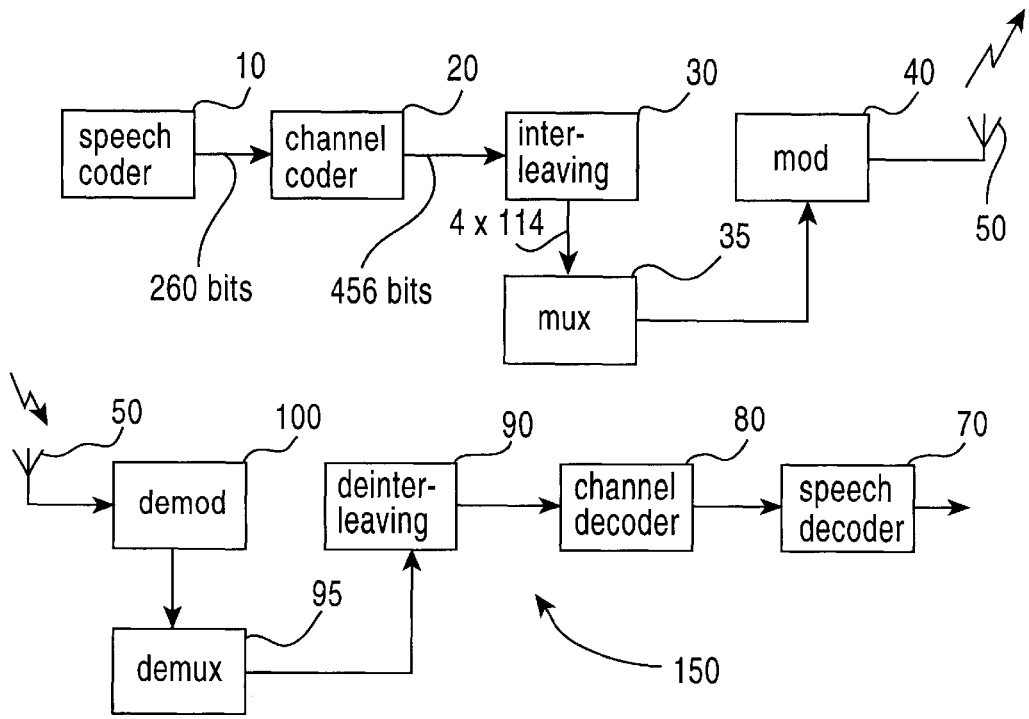
Fig. 4

| Block | Burst's number | | | | | | | | | |
|---|---|---|---|---|---|---|---|---|---|---|
| | 0 | 1 | 2 | 3 | 4 | 5 | 6 | 7 | 8 | 9 |
| | | | | | | | | | | |
| Current BC0 | 1 | 2 | 3 | 4 | 1 | 2 | 3 | 4 | 1 | 2 |
| data blocks ready | | | | C0 | | | | C0 | | |

Fig. 3 Prior Art

| Block | Burst's number | | | | | | | | | |
|---|---|---|---|---|---|---|---|---|---|---|
| | 0 | 1 | 2 | 3 | 4 | 5 | 6 | 7 | 8 | 9 |
| | | | | | | | | | | |
| QC0 LSB | 1 | 2 | 3 | 4 | 1 | 2 | 3 | 4 | 1 | 2 |
| QC1 MSB | 3 | 4 | 1 | 2 | 3 | 4 | 1 | 2 | 3 | 4 |
| data blocks ready | | C1 | | C0 | | C1 | | C0 | | C1 |

Fig. 7

| Block | Burst's number | | | | | | | | | |
|---|---|---|---|---|---|---|---|---|---|---|
| | 0 | 1 | 2 | 3 | 4 | 5 | 6 | 7 | 8 | 9 |
| | | | | | | | | | | |
| QU0 LSB | 1 | | 3 | | 1 | | 3 | | 1 | |
| QU0 MSB | 2 | | 4 | | 2 | | 4 | | 2 | |
| QU1 LSB | | 1 | | 3 | | 1 | | 3 | | 1 |
| QU1 MSB | | 2 | | 4 | | 2 | | 4 | | 2 |
| data blocks ready | | | U0 | U1 | | | | U0 | U1 | |

MULTIPLEXING METHOD AND TRANSCEIVER

FIELD OF THE INVENTION

The invention relates to a multiplexing method used in a TDMA radio system, in which method connections are set up by means of signals that are transmitted in time slots and that are modulated before the transmission, and wherein a signal consisting of bits is received and channel-coded into channel-coded signals each of which is interleaved into blocks of a predetermined size.

BACKGROUND OF THE INVENTION

In digital radio systems, information can be transmitted by means of binary symbol sequences. Binary symbol sequences constitute a signal to be transmitted, and the placement of binary symbol sequences in the signal to be transmitted is called digital modulation. Digital modulation is carried out in practice by a digital modulator. In the simplest form, the modulator places the binary symbol sequences in the signal regardless of the blocks that have already been transmitted or that will be transmitted later. The modulator may place the symbols in multiple levels in the signal in order to form several different waveforms. The prior art teaches the use of for example the digital QPSK modulation method as a multilevel modulation method.

In GSM systems, it is possible to use the TDMA multiple access method wherein signals are transmitted in the form of bursts in time slots. A speech signal is coded into time slots by different coding methods. A speech signal is formed into blocks of for example 260 bits that are channel-coded into signals of typically 456 bits. The channel-coded signal is interleaved in order to decrease the effect of possible interfering signals on the information signal. The interleaving can be carried out for example such that the 456 bits are divided into four blocks each of which consists of 114 bits. Each block fills one burst in whole. After the interleaving the signal is modulated, whereafter it is transmitted to the radio path.

The amount of traffic and the number of users continue to increase in radio systems. Since the bandwidth used in radio systems is limited, the number of available channels in a radio system is at times insufficient for all the users to be able to set up a connection. If a connection from a base station to a subscriber terminal, for example, can be set up, the connection may be relatively slow in some cases and therefore transmission of information takes a long time. The interleaving methods used in the prior art have not always been sufficiently effective so that the capacity and data rate in the radio system could be increased in an easy manner.

BRIEF DESCRIPTION OF THE INVENTION

The purpose of the invention is to implement a multiplexing method and a transceiver realizing the method, such that the aforementioned problems can be solved. This is achieved with a multiplexing method of the type described in the introduction, characterized by multiplexing at least two blocks together, followed by modulating said blocks into the same time slot with a modulation method that is adapted to the number of the blocks to be modulated, and transmitting the modulated blocks as a communication signal in a time slot, so that the transmission speed of the communication signal and the number of the connections to be established can be increased.

The invention also relates to a transceiver that is used in a TDMA radio system and that sets up a connection to another transceiver by transmitting modulated signals in time slots, and that receives a signal consisting of bits, and that comprises coding means for channel-coding the received signal into channel-coded signals, and interleaving means for interleaving each channel-coded signal into blocks of a predetermined size.

The transceiver according to the invention is characterized in that the transceiver comprises multiplexing means that receive blocks from the interleaving means and that multiplex at least two blocks together, and modulation means that modulate said blocks based on the number of the blocks to be multiplexed, whereafter the modulated blocks are transmitted as a communication signal in a time slot, so that the transmission speed of the communication signal and the number of the connections to be established can be increased.

The preferred embodiments of the invention are disclosed in the dependent claims.

The basic idea of the invention is that the transceiver multiplexes the interleaved signal blocks, so that when the blocks are modulated by a multilevel modulation method, several signal blocks can be transmitted in the same burst. The transceiver also demodulates the signal it has received from the radio path by a multilevel modulation method and performs demultiplexing so that the signal blocks that were in the same burst can be interleaved again.

The multiplexing method and the transceiver according to the invention provide several advantages. The method makes it possible to increase the data rate of a signal used over a connection between two transceivers. The method also enables an increase in the number of subscriber terminals, for example. The structure of the transceiver does not have to be modified greatly, but the presently used structural parts can be utilized mostly without any changes.

BRIEF DESCRIPTION OF THE DRAWINGS

The invention will be described in greater detail in connection with the preferred embodiments with reference to the appended drawings, in which FIG. 1 shows a prior art transceiver, FIG. 2 shows the structure of a burst, FIG. 3 shows the placement of prior art signal blocks in bursts, FIG. 4 shows a transceiver according to the invention, FIG. 7 shows an example of a multiplexing table for signal blocks, FIG. 8 shows another example of a multiplexing table for signal blocks.

DETAILED DESCRIPTION OF THE INVENTION

Figure 5:
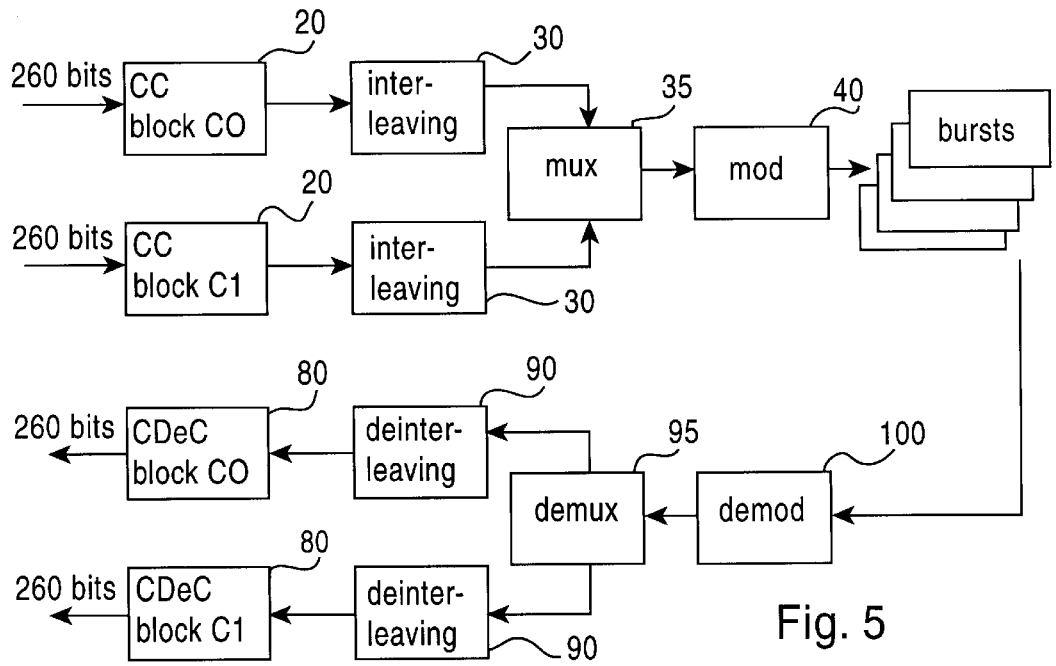
FIG. 5 shows, in greater detail, a transceiver according to the invention.

FIG. 1 shows a prior art transceiver. The transceiver comprises speech coding means 10, channel coding means 20, interleaving means 30, modulation means 40, speech decoding means 70, channel decoding means 80, deinterleaving means 90 and demodulation means 100. The transceiver also comprises an antenna 50 that operates in practice as a transceiving antenna. The speech coding means 10, the channel coding means 20, the interleaving means 30 and the modulation means 40 constitute the transmitting end of the transceiver. The speech decoding means 70, the channel decoding means 80, the deinterleaving means 90 and the demodulation means 100 form the receiving end of the transceiver.

FIG. 2 shows a burst used in a GSM system. More accurately, the burst is a so-called normal burst where information is transmitted. In a GSM system, transmitting a burst requires the capacity of one time slot. A burst comprises two packets of 57 information bits, a training sequence, two tails of three bits, and two stealing flags of one bit. A burst begins with three tail bits, which are followed by the first packet of 57 information bits, which is followed by a 1-bit stealing flag. The following sections of the burst include a training sequence of 26 bits, a second stealing flag and a second data packet of 57 information bits. The burst ends with three tail bits.

A prior art transceiver sets up a connection to another transceiver by transmitting a communication signal in each 57-bit information packet. The speech coding means 10 receive signals that it typically codes into signals of 260 bits. A 260-bit signal is supplied to the channel coding means 20, which code the received signal into a 456-bit signal, which is supplied further to the interleaving means 30. The interleaving means 30 interleave the received signal in a known manner. The interleaving means 30 form four 114-bit signal blocks from the 456 bits. Each 114-bit block is supplied to the modulation means 40 that modulate the signal into each information packet. Next, the modulated signal is transmitted via the antenna 50 to another transceiver.

In a prior art transceiver, four bursts are needed to transmit all the information from one 456-bit channel-coded signal that is formed into four 114-bit signal blocks. FIG. 3 shows the placement of prior art signal blocks in bursts. The figure clearly shows that at least four bursts are required in order that all four 114-bit blocks could be forwarded to the radio path.

FIG. 4 shows a transceiver 150 according to the invention. The transceiver comprises speech coding means 10, channel coding means 20, interleaving means 30, multiplexing means 35 and modulation means 40. The aforementioned means 10, 20, 30, 40 form the transmitting end of the transceiver. The transceiver also comprises speech decoding means 70, channel decoding means 80, deinterleaving means 90, demultiplexing means 95 and demodulation means 100. The means 70, 80, 90, 95 and 100 form the receiving end of the transceiver. The transceiver also comprises an antenna 50 that operates in practice as a transceiving antenna.

As regards the speech coding means 10, the channel coding means 20, the interleaving means 30, the decoding means 70, the channel decoding means 80 and the deinterleaving means 90, the arrangement according to the invention operates in the same way as a prior art transceiver. The coding means 10 code a signal it has received into 260-bit signals and the coded signal is supplied to the channel coding means 20, which code the 260-bit signal further into a 456-bit signal. The signal coded into the 456-bit form is supplied to the interleaving means 30 that interleave the received signal in a known manner. The interleaving means 30 form four 114-bit signal blocks from the 456-bit signal it has received.

The signal blocks formed by the interleaving means 30 are supplied to the multiplexing means 35, which multiplex at least two 114-bit signal blocks that have been interleaved by the interleaving means 30 for transmission in the same burst. These two signal blocks may be formed of the same or different 456-bit channel-coded signals. The interleaved blocks can be transmitted in the same burst since the modulation means 40 use multilevel modulation. The modulation means 40 modulate the signals by a modulation method of at least four levels. The number of modulation levels used is preferably exactly four.

In the direction of reception, the transceiver receives with the antenna 50 a burst that comprises an information block having the length of preferably two 114-bit signals. The demodulation means 100 demodulate the received signal burst that is supplied further to the demultiplexing means 95, and the blocks that were in the same burst are reorganised. The signals are supplied from the multiplexing means 95 to the interleaving means 90 that reorganise the bits in the blocks. The interleaving means 90 form 456-bit signals that are supplied to the channel decoding means 80, which decode each received 456-bit signal into a 260-bit signal.

FIG. 5 shows, in greater detail, a transceiver according to the invention. The transceiver comprises two channel coding means 20 each of which receives a 260-bit signal. One coding means 20 codes the received signal into signal C0 and the other coding means 20 codes the received signal into signal C1. It can be assumed that the coding into signal C0 is carried out prior to the coding into signal C1. Each coding means 20 codes the received signal into a 456-bit signal. Thereafter, each 456-bit signal is supplied into separate interleaving means 30 that form two 4-signal blocks from the signals, each block having a length of 114 bits. The 114-bit blocks are supplied to the multiplexing means 35, which multiplex the blocks such that one and the same burst may comprise 114-bit blocks that are formed of only one or both of the 456-bit signals.

Figure 6:
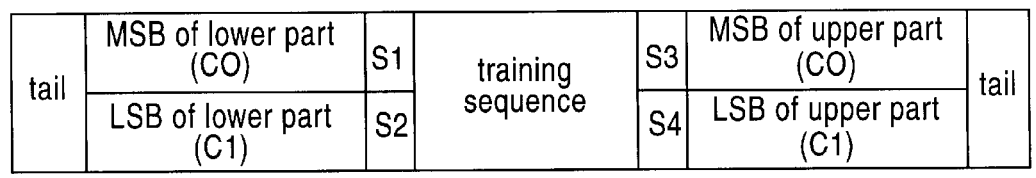
FIG. 6 shows a burst formed by a transceiver according to the invention.

FIG. 6 shows a burst formed by a transceiver according to the invention. The figure shows that information contained in two 114-bit blocks is transmitted simultaneously in the burst. This means in practice that the transmission speed of the signal used over the connection and the number of connections to be set up can be increased. The figure also shows that the burst comprises four 1-bit stealing flags.

FIG. 7 shows an example of a multiplexing table for signal blocks. The figure shows that the multiplexing means 35 multiplex 114-bit blocks formed of two different 456-bit signals into the burst. For example, the multiplexing means 35 multiplex block one of signal C0 and block three of signal C1 into a burst denoted by zero. Block two of signal C0 and block four of signal C1 are multiplexed into burst number one. When block four of signal C1 has been multiplexed, all four blocks of signal C1 have been multiplexed.

The multiplexing means 35 also multiplex block three of signal C0 and block one of signal C1 into a burst denoted by two. Block four of signal C0 and block two of signal C1 are multiplexed into burst number three. When block four of signal C0 has been multiplexed, all four blocks of signal C0 have been multiplexed. The multiplexing method thus enables the doubling of the data rate.

The figure shows that the multiplexing processes of the blocks of signals C0 and C1 are on a mutual time shift having a length of two blocks. When the multiplexing means 35 multiplex blocks formed of two different channel-coded signals, the multiplexing means 35 postpone the beginning of the multiplexing of blocks of one signal by half of the duration of the channel-coded signal. This is clearly shown in FIG. 7, where blocks one and three of two different channel-coded signals are multiplexed into burst number zero, i.e. the multiplexing of the block of one signal has been postponed by two blocks. In such a situation, the length of the channel-coded signal is four blocks, half of which is two blocks.

FIG. 8 shows another example of a multiplexing table for signal blocks. The figure shows that the multiplexing means 35 multiplex two 114-bit blocks formed of the same 456-bit signal into a burst. The multiplexing means 35 multiplex for example the two first blocks of the four blocks of signal C0 into a burst denoted by zero. The multiplexing means multiplex the rest of the blocks of signal C0 into burst number two, and all four blocks of signal C0 have thus been multiplexed.

The multiplexing means 35 also multiplex the first two blocks of the four blocks of signal C1 into a burst denoted by one. The last two 114-bit blocks of signal C1 are multiplexed into a burst denoted by four. The multiplexing method of FIG. 8 makes it possible to double the number of connections. The multiplexing means 35 may also multiplex the blocks in a different manner from the above-described tables.

Figure 9:
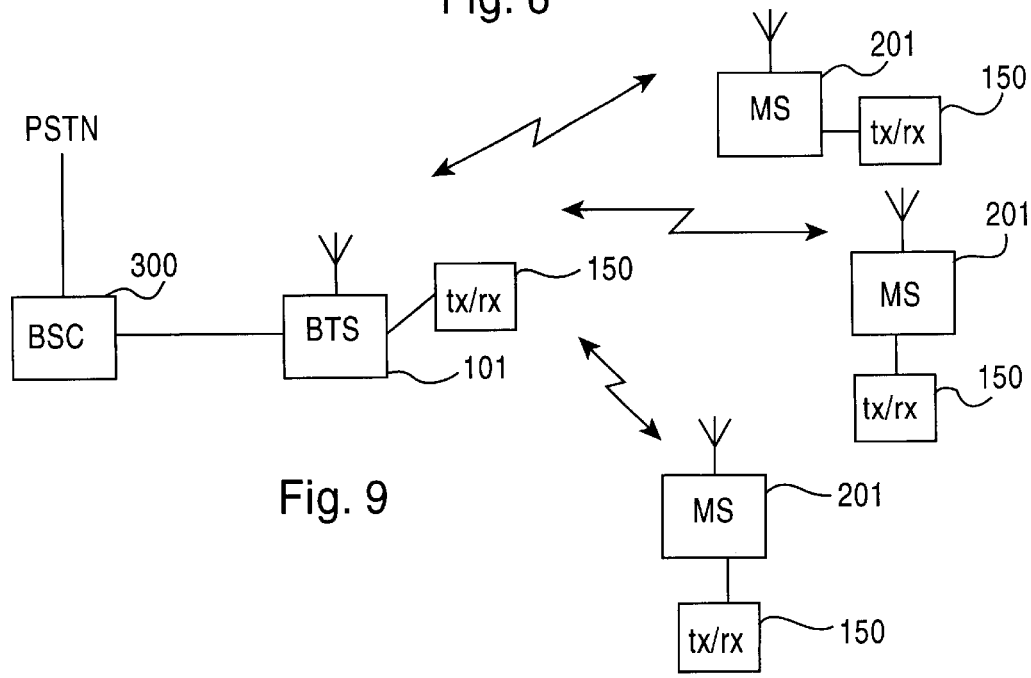
FIG. 9 shows a radio system utilizing the multiplexing method according to the invention.

FIG. 9 shows a radio system utilizing the multiplexing method according to the invention. The radio system comprises a base station controller 300, a base station 101 and a number of subscriber terminals 201 that may be mobile phones, for example. The base station 101 and the subsicber terminal 201 also comprise a transceiver 150, which utilizes the multiplexing method according to the invention. The multiplexing means 35 and the modulation means 40 may be implemented for example with an ASIC.

The advantageous multiplexing method used by the transceiver makes it possible to increase the channel capacity in the radio system. This means in practice that the number of subscriber terminals 201 can be increased for example to a double compared to the previous methods. Also, the data rate used over a connection between a base station and a subscriber terminal can be increased with the present multiplexing method and with a modulation method that has been selected suitably.

Even though the invention is described above with reference to an example according to the accompanying drawings, it is clear that the invention is not restricted thereto but it can be modified in several ways within the scope of the inventive idea disclosed in the appended claims.

What is claimed is:

1. A multiplexing method used in a TDMA radio system, in which method connections are set up by means of signals that are transmitted in time slots and that are modulated before the transmission, and wherein a signal consisting of bits is received and channel-coded into channel-coded signals each of which is interleaved into blocks of a predetermined size, the method comprising:

multiplexing at least two blocks together;

modulating said at least two blocks into the same time slot with a modulation method that is adapted to the number of the blocks to be modulated; and transmitting the modulated blocks as a communication signal in the time slot, so that the transmission speed of the communication signal and the number of the connections to be established can be increased;

wherein when the blocks to be multiplexed are formed at different times, the blocks of two different channel-coded signals are multiplexed preferably such that the block formed first in the first signal and the block formed third in the second signal are modulated for transmission in the same time slot.

2. A multiplexing method used in a TDMA radio system, in which method connections are set up by means of signals that are transmitted in time slots and that are modulated before the transmission, and wherein a signal consisting of bits is received and channel-coded into channel-coded signals each of which is interleaved into blocks of a predetermined size, the method comprising:

multiplexing at least two blocks together;

modulating said at least two blocks into the same time slot with a modulation method that is adapted to the number of the blocks to be modulated; and transmitting the modulated blocks as a communication signal in the time slot, so that the transmission speed of the communication signal and the number of the connections to be established can be increased;

wherein blocks formed of two different channel-coded signals are multiplexed such that the beginning of the multiplexing of blocks of one signal is postponed by half of the duration of the channel-coded signal.

3. A multiplexing method used in a TDMA radio system, in which method connections are set up by means of signals that are transmitted in time slots and that are modulated before the transmission, and wherein a signal consisting of bits is received and channel-coded into channel-coded signals each of which is interleaved into blocks of a predetermined size, the method comprising:

multiplexing at least two blocks together;

modulating said at least two blocks into the same time slot with a modulation method that is adapted to the number of the blocks to be modulated; and transmitting the modulated blocks as a communication signal in the time slot, so that the transmission speed of the communication signal and the number of the connections to be established can be increased;

wherein blocks formed of two different channel-coded signals are multiplexed such that the beginning of the multiplexing of blocks of one signal is postponed by two blocks.

4. A multiplexing method used in a TDMA radio system, in which method connections are set up by means of signals that are transmitted in time slots and that are modulated before the transmission, and wherein a signal consisting of bits is received and channel-coded into channel-coded signals each of which is interleaved into blocks of a predetermined size, the method comprising:

multiplexing at least two blocks together;

modulating said at least two blocks into the same time slot with a modulation method that is adapted to the number of the blocks to be modulated; and transmitting the modulated blocks as a communication signal in the time slot, so that the transmission speed of the communication signal and the number of the connections to be established can be increased;

wherein a multilevel modulation method is used if more than two blocks are modulated into the same time slot.

5. A multiplexing method used in a TDMA radio system, in which method connections are set up by means of signals that are transmitted in time slots and that are modulated before the transmission, and wherein a signal consisting of bits is received and channel-coded into channel-coded signals each of which is interleaved into blocks of a predetermined size, the method comprising:

multiplexing at least two blocks together;

modulating said at least two blocks into the same time slot with a modulation method that is adapted to the number of the blocks to be modulated; and transmitting the modulated blocks as a communication signal in the time slot, so that the transmission speed of the communication signal and the number of the connections to be established can be increased;

wherein a four-level modulation method is used if two blocks are modulated into the same time slot.

6. A transceiver that is used in a TDMA radio system and sets up a connection to another transceiver by transmitting modulated signals in time slots and that receives a signal consisting of bits, and that comprises coding means for channel-coding the received signal into channel-coded signals, interleaving means for interleaving each channel-coded signal into blocks of a predetermined size, the transceiver comprising:

multiplexing means that receive blocks from the interleaving means and that multiplex at least two blocks together in the same timeslot; and modulation means that modulate said at least two blocks based on the number of the blocks to be modulated, whereafter the modulated blocks are transmitted as a communication signal in the time slot, so that the transmission speed of the communication signal and the number of the connections to be established can be increased;

wherein blocks interleaved by the interleaving means are formed at different times, and the multiplexing means multiplexes the blocks of two different channel-coded signals such that the block formed first in the first channel-coded signal and the block formed third in the second channel-coded signal are multiplexed into the same time slot.

7. A transceiver that is used in a TDMA radio system and sets up a connection to another transceiver by transmitting modulated signals in time slots and that receives a signal consisting of bits, and that comprises coding means for channel-coding the received signal into channel-coded signals, interleaving means for interleaving each channel-coded signal into blocks of a predetermined size, the transceiver comprising:

multiplexing means that receive blocks from the interleaving means and that multiplex at least two blocks together in the same timeslot; and modulation means that modulate said at least two blocks based on the number of the blocks to be modulated, whereafter the modulated blocks are transmitted as a communication signal in the time slot, so that the transmission speed of the communication signal and the number of the connections to be established can be increased;

wherein the multiplexing means multiplexes the blocks of two different channel-coded signals, the multiplexing means postpones the beginning of the multiplexing of blocks of one channel-coded signal by half of the duration of the channel-coded signal.

8. A transceiver that is used in a TDMA radio system and sets up a connection to another transceiver by transmitting modulated signals in time slots and that receives a signal consisting of bits, and that comprises coding means for channel-coding the received signal into channel-coded signals, interleaving means for interleaving each channel-coded signal into blocks of a predetermined size, the transceiver comprising:

multiplexing means that receive blocks from the interleaving means and that multiplex at least two blocks together in the same timeslot; and modulation means that modulate said at least two blocks based on the number of the blocks to be modulated, whereafter the modulated blocks are transmitted as a communication signal in the time slots, so that the transmission speed of the communication signal and the number of the connections to be established can be increased;

wherein the multiplexing means multiplexes the blocks of two different channel-coded signals, the multiplexing means postpones the beginning of the multiplexing of blocks of one channel-coded signal by two blocks.

9. A transceiver that is used in a TDMA radio system and sets up a connection to another transceiver by transmitting modulated signals in time slots and that receives a signal consisting of bits, and that comprises coding means for channel-coding the received signal into channel-coded signals, interleaving means for interleaving each channel-coded signal into blocks of a predetermined size, the transceiver comprising:

multiplexing means that receive blocks from the interleaving means and that multiplex at least two blocks together in the same timeslot; and modulation means that modulate said at least two blocks based on the number of the blocks to be modulated, whereafter the modulated blocks are transmitted as a communication signal in the time slot, so that the transmission speed of the communication signal and the number of the connections to be established can be increased;

wherein the modulation means modulates more than two blocks into the same time slot with a multilevel modulation method.

10. A transceiver that is used in a TDMA radio system and sets up a connection to another transceiver by transmitting modulated signals in time slots and that receives a signal consisting of bits, and that comprises coding means for channel-coding the received signal into channel-coded signals, interleaving means for interleaving each channel-coded signal into blocks of a predetermined size, the transceiver comprising:

multiplexing means that receive blocks from the interleaving means and that multiplex at least two blocks together in the same timeslot; and modulation means that modulate said at least two blocks based on the number of the blocks to be modulated, whereafter the modulated blocks are transmitted as a communication signal in the time slot, so that the transmission speed of the communication signal and the number of the connections to be established can be increased;

wherein the modulation means modulates two blocks into the same time slot with a four-level modulation method.

* * * * *